United States Patent [19]
Von Lowis et al.

[11] 3,754,795
[45] Aug. 28, 1973

[54] VEHICLE BRAKING SYSTEM

[75] Inventors: Alexander Von Lowis, Mauren; Josef Trui, Bissingen, both of Germany

[73] Assignee: Robert Bosch GmbH, Stuttgart, Germany

[22] Filed: Aug. 5, 1971

[21] Appl. No.: 169,335

[30] Foreign Application Priority Data
Aug. 13, 1970 Germany............... P 20 40 206.6

[52] U.S. Cl............................. 303/21 F, 188/181 A
[51] Int. Cl................................................ B60t 8/02
[58] Field of Search................. 303/21 F, 61–63, 303/68–69; 188/181 A

[56] References Cited
UNITED STATES PATENTS
3,666,328  5/1972  Williams........................... 303/21 F
3,623,778  11/1971  Horvath............................. 303/21 F Primary Examiner—Duane A. Reger
Attorney—Michael S. Striker

[57] ABSTRACT

Rotatable road wheels of a vehicle are associated with fluid-operated brakes and with pressure-exerting brake-operating means for operating the brakes. An anti-blocking system is provided between the brakes and the brake-operating means and has a sensor which senses the revolutions of the road wheels, an electromagnetic valve controlled by the sensor and able to switch on and off a source of compressed air, a control valve which controls the flow of brake fluid to the brakes and which is movable between an open and a closed position, and a reducing piston which switches the control valve between its positions and which is movable in a sense switching the control valve to closed position under the influence of pressure fluid from the compressed air source, and in a sense switching the control valve to open position under the influence of pressure exerted by the brake-operating means.

4 Claims, 2 Drawing Figures

Patented Aug. 28, 1973

INVENTOR.
ALEXANDER VON GOGIS
JOSEF TRUI
BY
Mulcel S. Stuker
Attorney

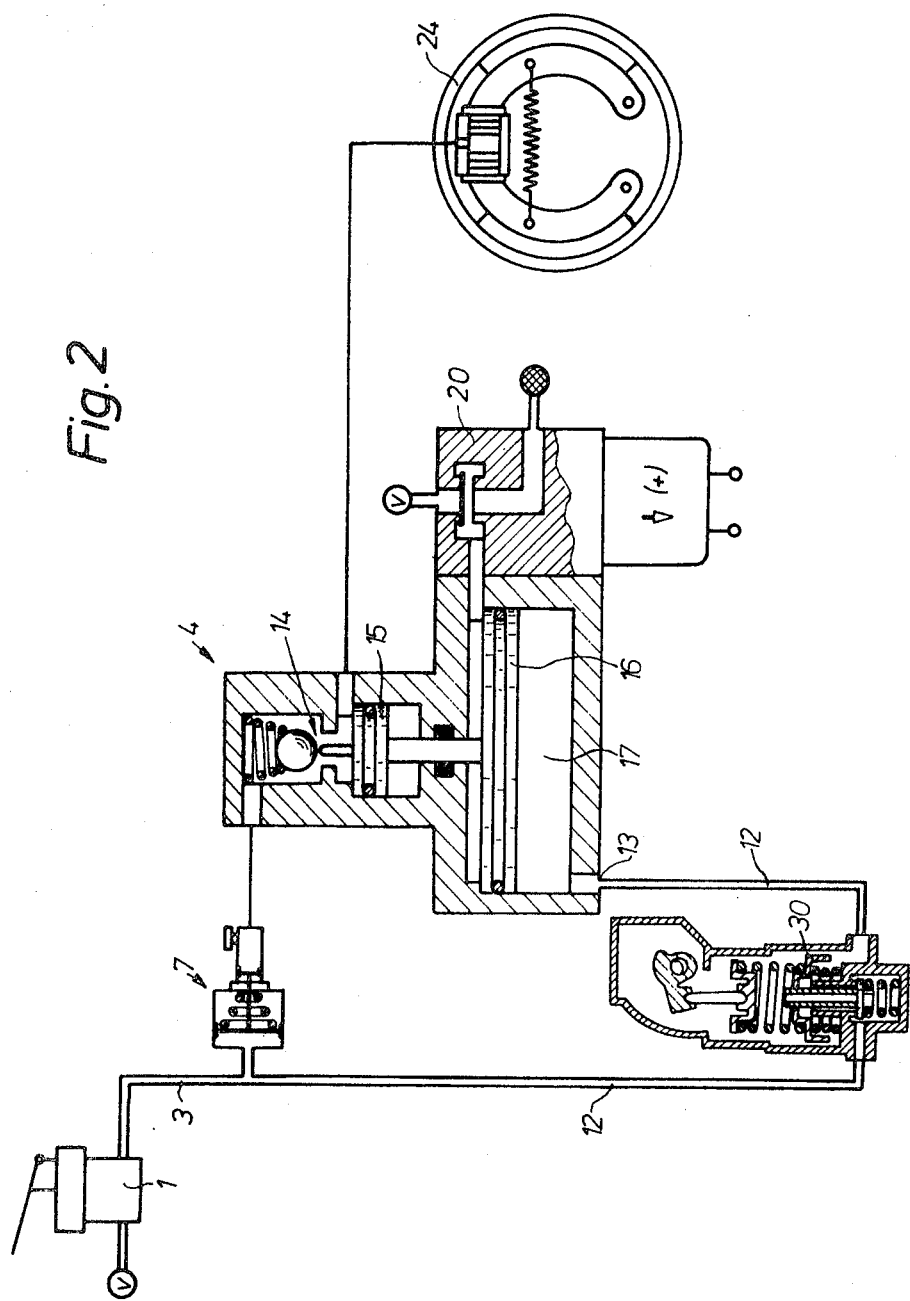

VEHICLE BRAKING SYSTEM

BACKGROUND OF THE INVENTION

The present invention relates generally to a vehicle, and more particularly to a vehicle having road wheels. Still more particularly the invention relates to a vehicle braking system and, in particular, to a vehicle having a braking system provided with an anti-blocking arrangement.

From German Gebrauchsmuster 6,906,118 it is already known to provide a vehicle with a brake system having an anti-blocking device. In this system the wheels are associated with brakes which in turn are provided with a connection to a brake-operating means. Interposed between the brake operating means and the brake is an anti-blocking arrangement controlled via a sensor by the rotation of the wheels. The anti-blocking device has an electromagnetic valve which is influenced by the sensor, a control valve which supervises the flow of brake fluid through the brake line, and a reducing piston which switches the control valve and which is influenced, in a sense closing the control valve, by the pressure derived from a pressure source which is switched into the system by the magnetic valve when the latter is operated. While the system just mentioned is operative it is to be noted that the reducing piston is acted upon only one-sidedly by varying pressure. This means that a relatively long response time is required so that short response times, which are of course desirable in anti-blocking devices, cannot be achieved.

SUMMARY OF THE INVENTION

It is, accordingly, an object of the present invention to avoid the disadvantages of the prior art.

More particularly it is an object of the present invention to provide an improved vehicle braking system having an anti-blocking device which responds and switches much more rapidly than what is known from the art.

A concomitant object is to provide such a system and such a device which is simple in its construction.

In pursuance of the above objects, and of others which will become apparent hereafter, one feature of the invention resides in a vehicle which, briefly stated, comprises rotatable road wheels and fluid-operated brake means for breaking the rotation of the road wheels. Pressure-exerting brake-operating means is associated with the brake means and anti-blocking means is interposed between the brake means and the brake-operating means. The anti-blocking means comprises sensing means which senses the revolutions of the road wheels, electromagnetic valve means controlled by the sensing means, control valve means controlling the flow of fluid to the brake means and movable between an open and a closed position, a source of pressure fluid connectable with the control valve means by operation of the electromagnetic valve means, and a reducing piston which switches the control valve means and is movable in a sense switching the control valve means to closed position under the influence of pressure fluid from the source, and in a sense switching the control valve means to open position under the influence of pressure from the brake-operating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view analogous to FIG. 1 but illustrating a second embodiment of the invention.

DESCRIPTION OF THE PREFERRED EMBODIMENTS

Figure 1:
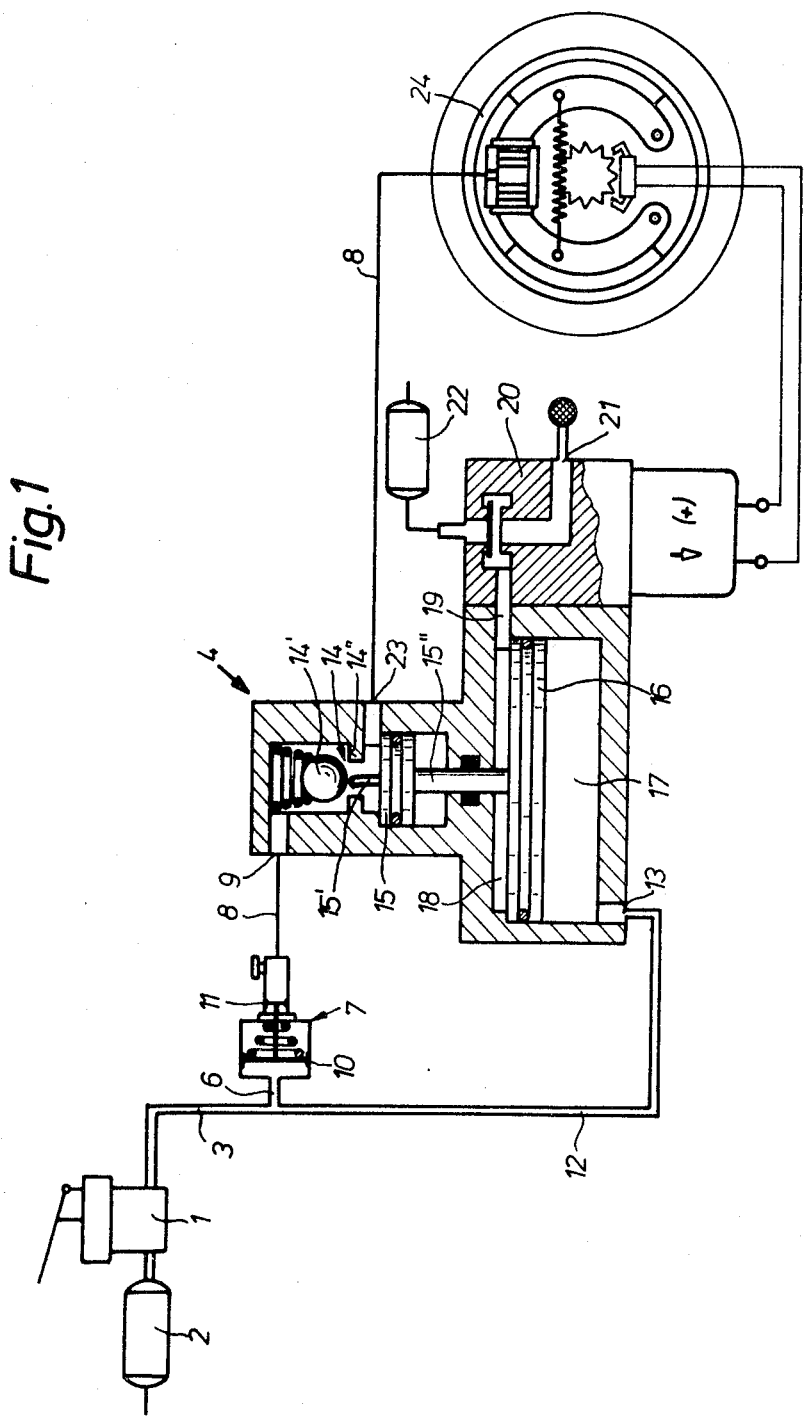
FIG. 1 is a somewhat diagrammatic illustration showing a first embodiment of the invention.

Discussing firstly FIG. 1 it will be seen that the vehicle braking system illustrated therein is provided with a brake valve 1 which may also be considered a brake-operating means; it is connected with a supply container 2 for compressed air. An air conduit 3 connects the valve 1 with an auxiliary cylinder via a branch 6, and via an additional branch 12 with the inlet 13 of an anti-blocking device 4. The auxiliary cylinder is identified with reference numeral 7, and a hydraulic line 8 connects it with the inlet 9 of the unit 4. The auxiliary cylinder 7 is constructed as a pressure-translating device having a pneumatic piston 10 which is influenced by pressure in the air conduit 6, and which is mechanically connected with a smaller hydraulic piston 11.

Located in and constituting a part of the unit 4 is a switching valve 14 which utilizes a valve seat 14″ cooperating with a ball-shaped valve member 14′. Beneath the valve 14 is located a hydraulic piston 15 which can act upon the valve 14 via a rod 15′ and which is fixedly connected with a larger compressed-air operated reducing piston 16 via a rod 15″. Beneath the piston 16 is provided a chamber 17 with which the inlet 13 communicates, and a chamber 18 is above the piston 16 and connected with a magnetic valve 20 via a conduit 19. The magnetic valve 20 supervises respective connections of the chamber 18 with an atmospheric-air connection 21 and with a supply container 22. It is pointed out that the containers 2 and 22 may either be supplied with one and the same (not illustrated) source of compressed air, for instance a compressor, or they may be supplied by individual sources or alternately the containers 2 and 22 may be replaced by a single container.

A connection 23 intermediate the valve 14 and the piston 15 connects the hydraulic brake line 8 with the road wheel brakes 24. The road wheels are shown for purposes of illustration, as is a sensor which cooperates with the magnetic valve 20.

In operation of the braking system, and assuming that a braking incident is being initiated, the brake valve 1 is operated and compressed air from container 2 flows via the conduit 3 and 6 to the auxiliary cylinder 7, and via the conduit 3 and 12 to the chamber 17 of the unit 4. This causes the compressed air to act upon the piston 16 which latter is pushed upwardly so that the hydraulic piston 15 displaces via the rod 15′ the valve 14 to open position. Via the thus-opened control valve 14 the hydraulic brake pressure, which is translated by the auxiliary piston 7, enters into the brake line 8 to act upon vehicle brakes 24 so that the wheels are now braked.

Assuming, now, that one of the wheels becomes blocked during such braking, then the magnetic valve 20 is energized via the diagrammatically illustrated sensor (which may be of known type such as that disclosed in the aforementioned prior-art German Gebrauchsmuster) and the valve 20 thus becomes displaced from the illustrated switching position into its other switching position. As a result of this compressed air from the container 22 can flow into the chamber 18 displacing the piston 16 downwardly and causing the piston 15 with rod 15' to participate in such movement. This effects movement of the control valve 14 to closed position and the hydraulic pressure in the brake line 8—which is located behind the valve 14—is reduced. The blocked wheel is now released again and can resume turning, which is sensed by the sensor whereupon the latter de-energizes the magnetic valve 20.

It will be appreciated that the present invention assures a very rapid response of the unit 4 by utilizing compressed-air counterpressure at the piston 16. Furthermore, an additional advantage over what is known from the prior art is that a biasing spring in the chamber 17 is avoided in the construction according to the present invention, and that a source of error is eliminated which previously resulted from the use of such biasing springs where the strong forces acting upon such a spring in the case of pressure reduction—which occurs in rapid sequence in such units—can easily lead to a breakage of the spring and to malfunction.

The embodiment of FIG. 2 is basically constructed along the same lines as that in FIG. 1, and the same reference numerals have been utilized to designate like elements. In this embodiment, however, a load-dependent pressure-limiting device 30 is interposed in the conduit 3 and 12 which originates at the valve 1, meaning that in addition to the operation which is described above with respect to the system of FIG. 1, the embodiment according to FIG. 2 has the possibility of load-dependent braking force limitation. In operation of the system illustrated in FIG. 2, braking causes above the piston 15 the brake pressure which is supplied to the brakes 24, and in the chamber 17 beneath the piston 16 the load-dependently reduced brake pressure, so that the valve 14 will move between its open and closed positions (that is change its switching position) at a low brake pressure, meaning that the brake pressure is load-dependently reduced. If in the system of FIG. 2 the device or unit 4 becomes activated as a result of blockage of a road wheel, then the brake pressure is further reduced until the wheel will again turn. After the magnetic valve is subsequently de-energized, the brake pressure supplied to the brakes 24 is again regulated in a load-dependent sense. This regulation takes place analogously to an interception control, meaning that the pressure level determined by the load-dependent pressure-limiting device 30 is not exceeded. Of course it will be appreciated that a simple pressure-limiting device can be used, instead of a load-dependent device 30, and in this case a single one will be adequate for each wheel axle.

An additional advantage of the embodiment of FIG. 2 is the fact that if the brake pressure supplied by the valve 1 and controlled by the device 30 beneath the piston 16 is so limited in its level that in case of full braking the critical pressure ratio (p reducing piston 16)/(p container 22) = 0.528 is not exceeded, then the compressed air will enter out of the container 22 with the speed of sound whereby shortest possible regulating times are achieved even at very small brake pressure in the brake line, a consideration which is particularly important in certain circumstances, for instance if the vehicle suddenly moves from a dry road onto an iced road.

It will be understood that each of the elements described above, or two or more together, may also find a useful application in other types of constructions differing from the types described above.

While the invention has been illustrated and described as embodied in a vehicle brake system, it is not intended to be limited to the details shown, since various modification and structural changes without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential features of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. In a vehicle having a source of pressure fluid, in combination, rotatable road wheels; fluid-operated brake means for braking the rotation of said road wheels; pressure exerting brake-operating means associated with said brake means; anti-blocking means interposed between said brake means and brake-operating means said anti-blocking means comprising sensing means sensing the revolutions of said road wheels, valve means controlling the flow of fluid to said brake means,and being movable between an open and a closed position, electro-magnetic valve means controlled by said sensing means and operative for connecting said source of pressure fluid with said control valve means, and a reducing piston switching said control valve means, and being movable in a sense switching said control valve means to closed position under the influence of pressure fluid from said source, and in a sense switching said control valve means to open position under the influence of pressure from said brake-operating means; brake line means connecting said brake operating means with said anti-blocking means and the latter with said brake means; and a pneumatically operated cylinder-and-piston unit interposed in said brake line means intermediate said brake-operating means and said anti-blocking means and receiving from the former fluid the same fluid as said reducing piston receives from said source.

2. In a vehicle as defined in claim 1, further comprising a regulating valve for adjusting the pressure which acts upon said reducing piston from said brake-operating means.

3. In a vehicle as defined in claim 1, wherein said cylinder-and-piston unit is a hydraulic unit.

4. In a vehicle as defined in claim 1, wherein said fluid supplied by said source is pressurized air.

* * * * *